L. E. HOGUE.

Farm-Fence.

No. 6,368. Reissued April 6, 1875.

Witnesses:

A. H. Norris

J. C. Patterson

Inventor:

L. E. Hogue,

By James L. Norris atty.

THE GRAPHIC CO. PHOTO-LITH. 39 & 41 PARK PLACE, N.Y.

UNITED STATES PATENT OFFICE.

LOVREN E. HOGUE, OF SANDY LAKE, PENNSYLVANIA.

IMPROVEMENT IN FARM-FENCES.

Specification forming part of Letters Patent No. 158,941, dated January 19, 1875; reissue No. 6,368, dated April 6, 1875; application filed March 24, 1875.

*To all whom it may concern:*

Be it known that I, LOVREN E. HOGUE, of Sandy Lake, in the county of Mercer and State of Pennsylvania, have invented certain Improvements in the Construction of Fences, of which the following is a specification:

My invention relates to fences specially designed for farms, and which can be firmly constructed and built upon any character of ground, whether level or uneven, without the necessity of the usual posts fixed in the ground.

My invention consists of a fence designed to rest upon the surface of the ground, the posts or slats forming the uprights being provided with inclined braces attached at their ends to stakes driven into the ground, whereby the posts or slats are secured and braced in a firm upright position. The rails, poles, or boards constituting the panels are grasped by the posts or slats, all of which will be fully hereinafter described.

Figure 1:
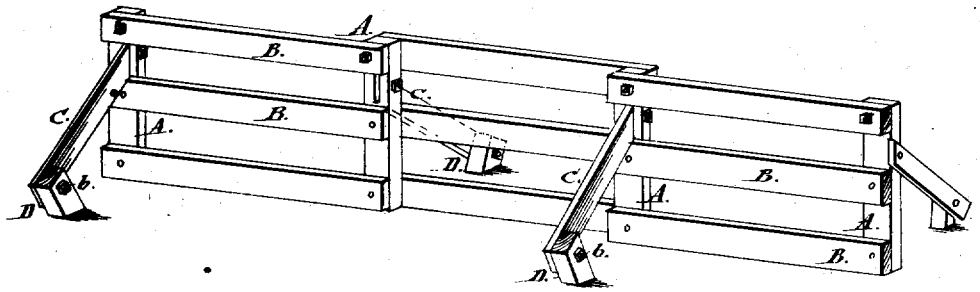
Figure 2:
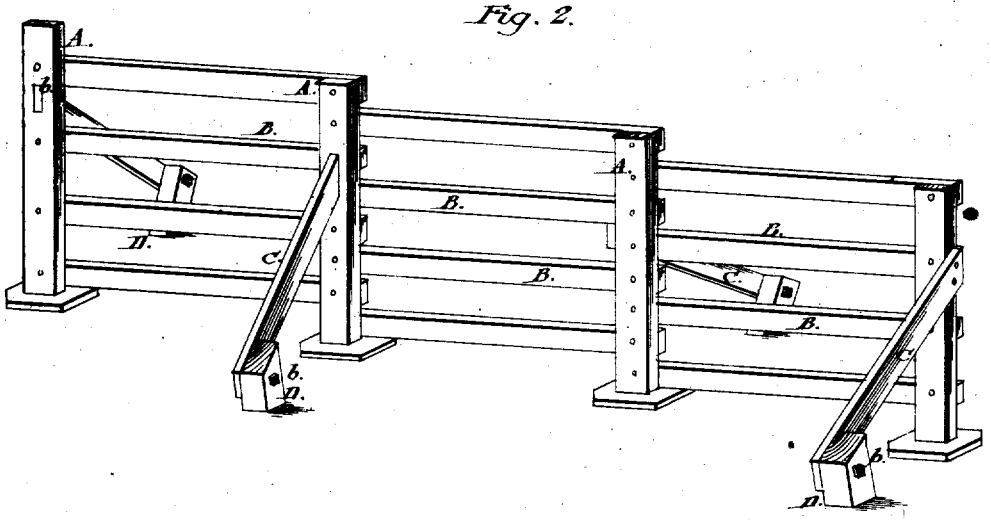

In the accompanying drawings, Figure 1 represents a perspective view of my improved fence; and Fig. 2 is a perspective view of a modification of the same, constructed of rails or boards upon sloping or hilly ground.

Referring to the accompanying drawings, in which like letters of reference indicate corresponding parts, the letter A represents the slats, posts, or standards, which are usually constructed from five to ten inches in width, and one to two inches thick; but it is evident the size of the same may be varied, and these slats or posts firmly and substantially connect the boards, rails, or poles B, which form the panels of the fence. The upright slats or posts may be secured alternately on opposite sides of the panels, as shown in Fig. 1, or all upon the same side, as represented in Fig. 2. Each slat, post, or standard A is supported in a firm, steady, and upright position by means of a brace, C, secured at one end at or near the upper end of said slat or post, and at its opposite end to a stake, D, which is driven into the ground to a sufficient depth to effectually accomplish its purpose.

The stakes and braces are arranged alternately upon opposite sides of the fence, in order to support and retain the same in a rigid upright position.

The braces may be attached to the boards or posts, and to the stakes, in any convenient and suitable manner; but I have shown the same secured by means of slots in the stakes and posts, within which the ends of the braces are confined by means of bolts, pins, or rivets, or in any preferred manner, as represented at *b b* in the drawings.

The slats or posts, instead of being arranged directly upon the surface of the ground, may be supported by stones, as at E E, Fig. 2.

The uprights will be attached to the boards, rails, or poles forming the panels of the fence, by nails, pins, or bolts.

It has heretofore been customary, in constructing or building fences of this class, to construct the same in sections, temporarily united, and supported upon cross-sills or pieces passing beneath the fence, to which the braces are secured, and which support the posts or standards to which the panels are attached; but in such fences there is no provision for attaching the same permanently and firmly to the ground, and the entire structure is liable to be blown away or thrown down in stormy or windy weather; and, moreover, where cross-sills are employed, it is evident that the fence is not adapted to be built or constructed upon hilly or uneven ground, and cannot possibly be set up or built upon masonry or stone supports or foundations, whereas, by my invention, these objections and difficulties are removed.

Having thus described my invention, what I claim as new, and desire to secure by Letters Patent, is—

The fence constructed as described, and resting directly upon the surface of the ground, and having the posts or slats and rails nailed together, said fence being anchored by the alternating inclined braces and the oblique ground-stakes, substantially as set forth.

In testimony whereof I have hereunto set my hand this 23d day of March, A. D. 1875.

LOVREN E. HOGUE.

Witnesses:

JAMES L. NORRIS,

GEO. W. CUSHING, Jr.